United States Patent [19]
Bouton

[11] Patent Number: 5,162,688
[45] Date of Patent: Nov. 10, 1992

[54] BRUSH HOLDER FOR A COMMUTATING ELECTRIC MACHINE

[75] Inventor: Joel Bouton, Eragny sur Oise, France

[73] Assignees: Automobiles Peugeot, Paris; Automobiles Citroen, Neuilly sur Seine, both of France

[21] Appl. No.: 737,713

[22] Filed: Jul. 30, 1991

[30] Foreign Application Priority Data

Jul. 30, 1990 [FR] France ............... 90 09702

[51] Int. Cl.⁵ ............................................. H02K 13/00
[52] U.S. Cl. .................................... 310/239; 310/42; 310/43; 310/248
[58] Field of Search .............. 310/239, 241, 242, 245, 310/247, 43, 248, 42, 71, 201

[56] References Cited

U.S. PATENT DOCUMENTS

| | | | |
|---|---|---|---|
| 4,355,253 | 10/1982 | Vollbrecht | 310/239 |
| 4,546,280 | 10/1985 | Pfluger | 310/239 |
| 4,801,833 | 1/1989 | Dye | 310/239 |
| 4,845,395 | 7/1989 | Huber | 310/239 |
| 4,978,877 | 12/1990 | Quirijnen | 310/239 |

FOREIGN PATENT DOCUMENTS

| | | |
|---|---|---|
| 0017524 | 10/1980 | European Pat. Off. . |
| 0343126 | 11/1989 | European Pat. Off. . |
| 3225939 | 1/1984 | Fed. Rep. of Germany ...... 310/239 |
| 2282182 | 3/1978 | France . |
| 2404328 | 4/1979 | France . |
| 2582872 | 12/1986 | France ........................... 310/239 |

Primary Examiner—R. Skudy
Attorney, Agent, or Firm—Burns, Doane, Swecker & Mathis

[57] ABSTRACT

A brush holder device for a commutating electric machine including a ring (7) integral with the stator, brush holders (6) fastened in a mounting position on the ring and connected electrically in pairs by conductors (101, 102) the ring being located perpendicularly to an axis of rotation (X—X') of a rotor (1) of the motor (M), a part whereof projects through a center opening of the ring (7). Each brush holder includes a recess located facing the periphery of the projecting part of the rotor (1) a commutator brush (5) is mounted in the recess so as to establish an electrical contact between the rotor and the stator. The brush holders (6) and the conductors (101, 102) form an integral part of the ring (7) made of a thermally stable insulating material. The brush holders (6, 6') and the conductors (101, 102) are fastened in their assembly position by being molded into an insulating and thermally stable material forming the ring. The invention is applicable to the production of commutating electric machines, such as electric motors of any type.

12 Claims, 3 Drawing Sheets

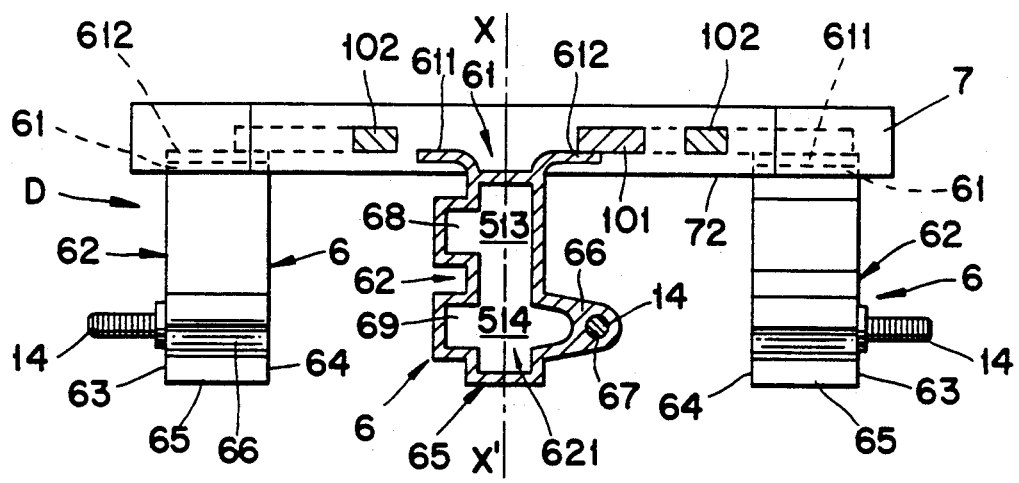
FIG. 3
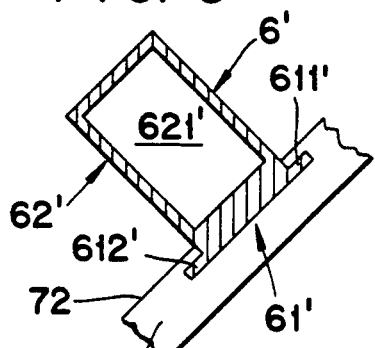
FIG. 6
FIG. 4
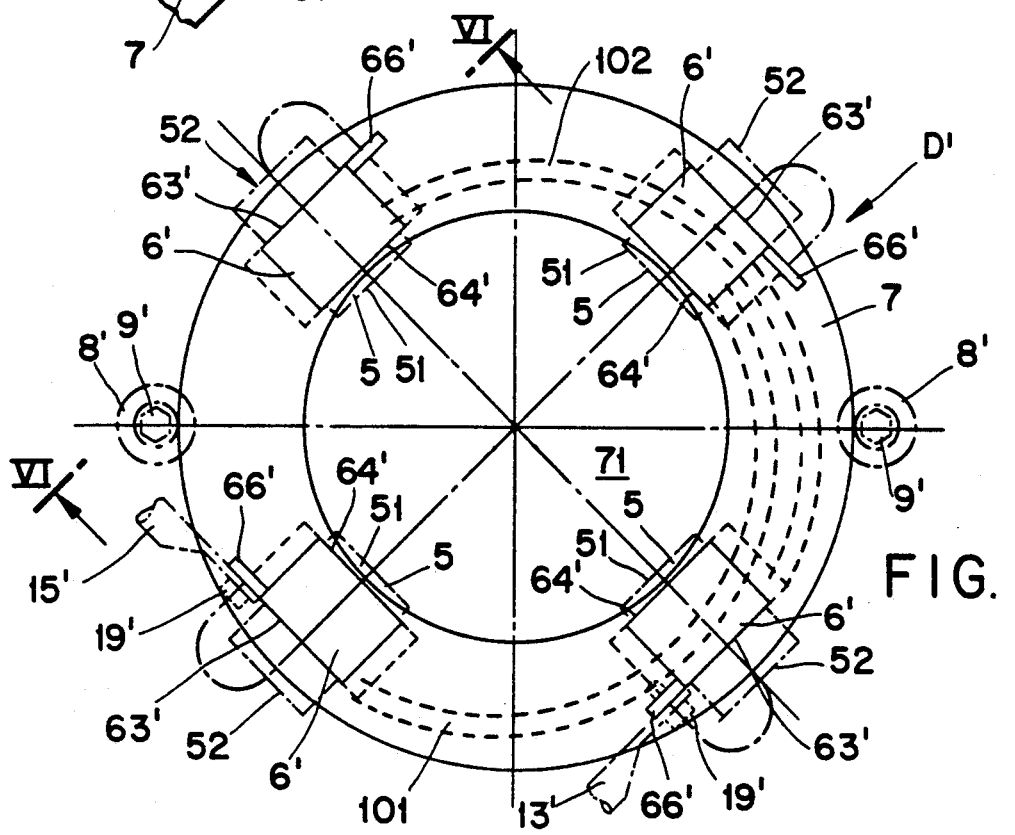
FIG. 5

BRUSH HOLDER FOR A COMMUTATING ELECTRIC MACHINE

BACKGROUND OF THE INVENTION

1. Field of the Invention

The present invention relates to a brush holder, for a commutating electric machine, such as for example a motor.

2. Description of Related Art

Electric machines with a commutator and of the type containing a rotor have been known for a long time. These electric machines include commutator brushes mounted on supports or brush holders at the periphery of the rotor, the holders or supports being integral with a stator and connected in pairs by electrical conductors. In this type of machine, the brush holders and electric conductors are fastened to a support in the form of a ring by rivets or screws. The ring is mounted on the machine perpendicularly to the axis of rotation of the rotor, and contains a center opening through which part of the rotor projects.

However, in order to obtain the best possible commutation between the poles of the machine, it is necessary to position the brush holders with precision relative to the part of the rotor with which the commutator brushes cooperate. For this, it is necessary to provide precisely machined mounting surfaces on the ring and to devote considerable time to the assembly of the unit.

It is thus readily seen that the means for mounting brush holders of the prior art are complex, as they contain a large number of parts, such as screws and nuts, and also expensive since they require precision machined surfaces and extensive assembly times.

OBJECTS AND SUMMARY OF THE INVENTION

It is an object of the invention to eliminate these disadvantages by providing a brush holder device which is homogeneous, contains fewer pieces and is more economical because it may be mounted rapidly and easily, without requiring precision machined surfaces.

For this purpose, the invention is a brush holder device for a commutating electrical machine of the type containing a ring integral with the stator, brush holders fastened in a mounting position to the ring and connected electrically in pairs by conductors. The ring is located perpendicularly to an axis of rotation X-X' of a motor rotor, a part whereof projects through a center opening of the ring. Each brush holder includes a recess located relative to the periphery of the projecting part of the rotor and in which a commutator brush is mounted so as to establish an electrical contact between the rotor and the stator, wherein the brush holders and the conductors form an integral piece with brush holders and the conductors are fastened in their assembly position by casting the said insulating material.

The invention is also characterized in that the transverse part of every brush holder consists of two lateral walls, which extend perpendicularly to the longitudinal part and on both sides of the latter.

It is further specified here that the electrical conductors are in the form of segments with an essentially square cross section and extend in a circular arc in a plane essentially parallel to a surface of the ring.

The invention is further characterized in that each conductor segment is connected at one end with a lateral wall of a brush holder and at the other with a lateral wall of another brush holder of the same polarity, which is diametrically opposed to the first, relative to the axis of the rotor.

According to still another characteristic of the invention, the ends of the conducting segments and the brush holders are connected by means of welding, soldering or crimping.

The device according to the invention is further characterized in that the brush mounted in the recess of each holder yoke consists of two contact elements.

It is further specified that the brush mounted in the recess contains two grooves opening opposite each contacting element of the commutating brush mounted in the recess, in order to apply a force to contact these element with the rotor.

BRIEF DESCRIPTION OF THE DRAWINGS

The invention will become more apparent from the detailed description of certain modes o embodiment given solely as examples, with reference to the drawings attached hereto, wherein:

FIG. 3 is a view of a section of the device on the line III—III of FIG. 2;

FIG. 4 is a section on the line IV—IV of FIG. 2, through the ring and the electrical conductors of the device;

FIG. 5 is a view similar to FIG. 2, representing a second mode of embodiment of the device according to the invention; and FIG. 6 is a partial view in section on the line VI—VI of FIG. 5.

DESCRIPTION OF PREFERRED EMBODIMENTS

Figure 1:
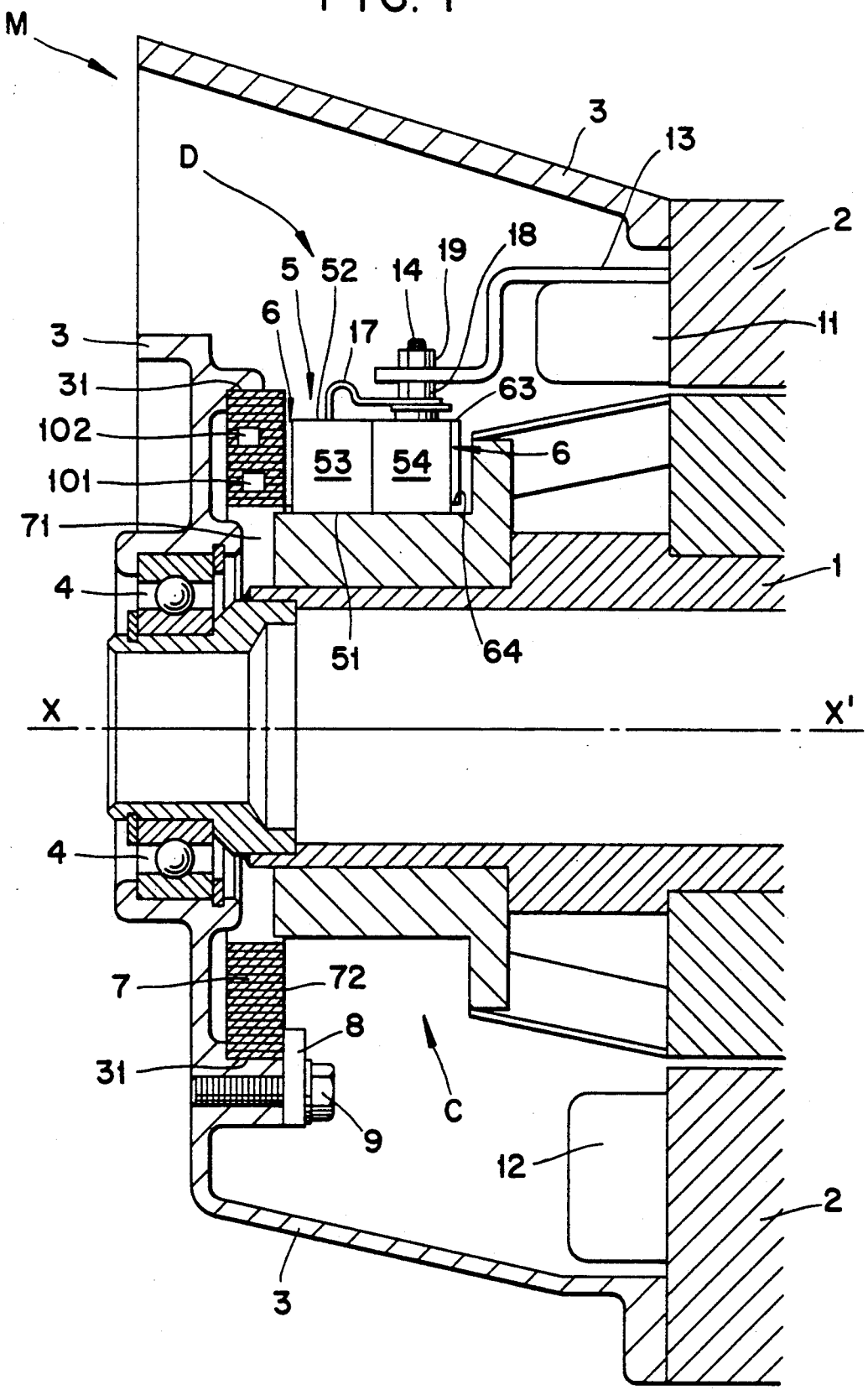
FIG. 1 is a view of a longitudinal section on the line I—I of FIG. 2, of an electric motor equipped with a device according to the invention.
Figure 2:
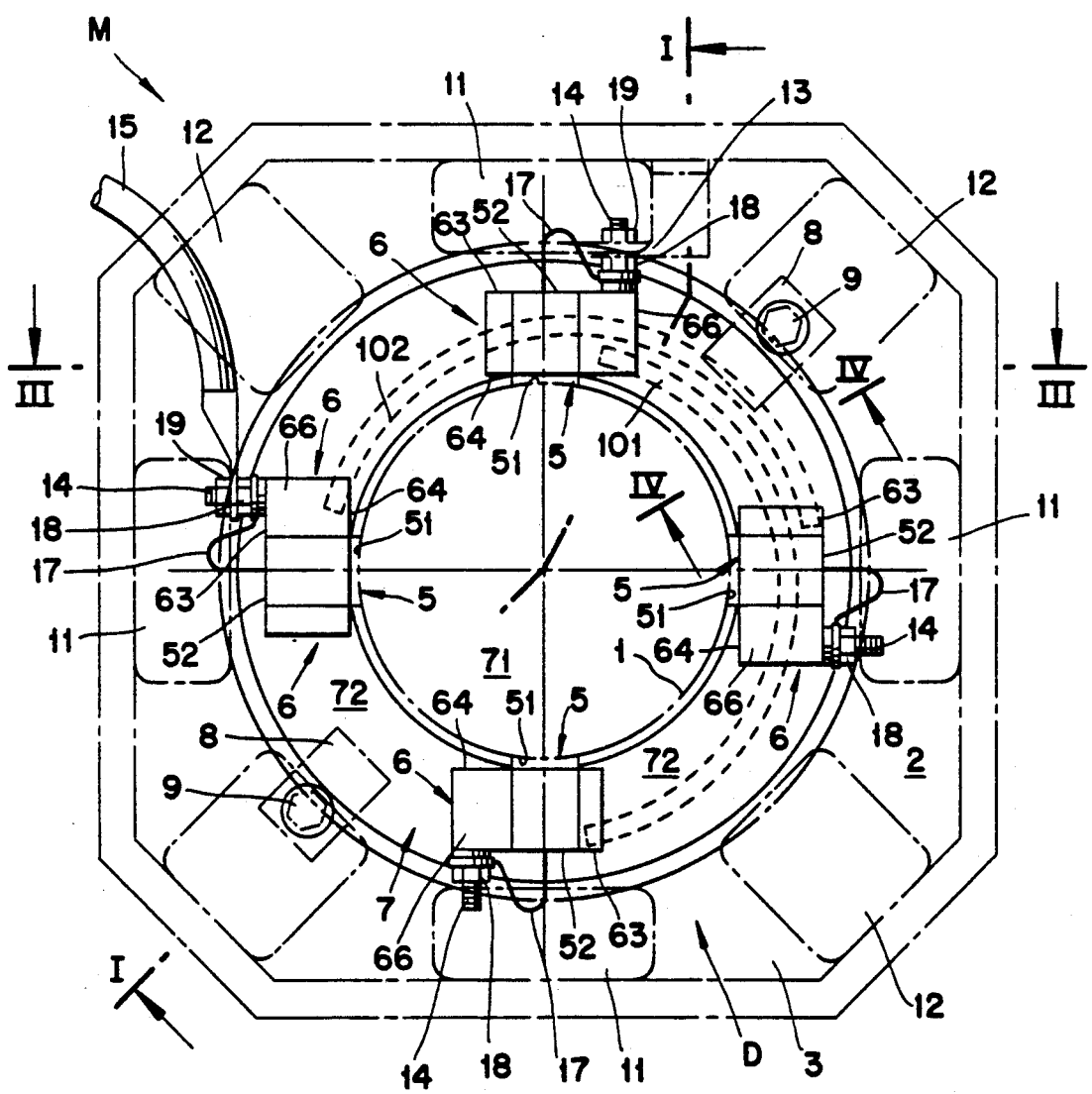
FIG. 2 is a front elevation of the device of FIG. 1, with part of the motor shown by dotted lines.

With reference to FIG. 1 and 2, it is seen that an electric commutator machine, such as the motor M, includes a rotor 1, a stator 2 and a commutator C, protected by a cover 3, which is integral with the stator 2.

The rotor is mounted rotating between two bearings, one of which is provided in the cover 3, around an axis of rotation X-X', in particular in a ball bearing 4 shown in FIG. 1.

The commutator C comprises four commutator brushes 5 which establish a electrical contact between the stator 2 and the rotor Each commutator brush is mounted in a support or brush holder 6, with a contact surface 51 of each brush abutting against the periphery of the commutator 6.

The brush holders 6 are mounted on a ring 7 attached to the cover 3 perpendicularly to the axis X-X' in a manner such that the rotor 1 projects through a circular opening 71 provided in the center part of the ring 7. The positioning of the ring 7-brush holder 6 assembly relative to the stator 2 is insured by a shoulder 31 of the cover 3, in which the ring 7 is mounted. The ring 7 is maintained in position by means of two plates 8 abutting against the ring 7 and fastened to the cover 3 with locking screws 9 mounted in threaded holes of the cover.

It is readily seen in FIG. 2 that each brush holder 6 has, on a face 63 opposing the contact surface 51 of the brush 5 located therein, a pin 14 attached by welding or screwing. An elastic contactor 17 is mounted on each of the pins 14 by means of nuts 18 and rests on a face 52 of the brush 5 opposing the contact surface 51.

The commutator brushes 5 are electrically connected in pairs by means of electric contactors 101 and 102, so that each pair of brushes 5 diametrically opposed relative to the axis X-X' of the rotor 1, forms a pole of a "sign" opposing that of the other pair of brushes. The primary and secondary windings of the stator, designated 11 and 12 are located at the periphery of the rotor 1.

One of the pairs of brushes 5 is connected with an electric blade terminal 13 projecting from the rotor 2 in the vicinity of a primary winding 11 and connected at its free end with a pin 14 of the corresponding brush holder 6 by means of a nut 19.

The other pair of brushes 5 is in turn connected with an electric connecting cable 15, which is also connected with a pin 14 of one of the brush holders 6 of this pair by a nut 19.

A first embodiment of a brush holder device according to the invention contains, as described above, a ring 7, brush holders 6 and electric conductors 101 and 102, and is now described with reference to FIGS. 1 to 4.

In FIG. 3 it is seen especially well that the ring 7 forms with the brush holders 6 and the electric conductors 101 and 102, an integral piece D, into which the electric conductors 101 and 102 and part of the brush holders 6 are embedded, essentially in their mounting position. The integral piece D is obtained by molding the embedded elements into an electrically insulating material and maintaining a high dimensional stability within a temperature range corresponding to the normal operating temperatures of the motor M. This material will be referred to hereafter as the thermally stable insulating material. According to the invention, the ring 7 makes it possible to maintain the piece D in the assembled state and also provides the electrical insulation of the conductors and the brush holders.

In FIG. 3 it is readily seen that in a cross section (i.e., in a section in a plane perpendicular to the radius of the ring 7 passing through the center of one of the brushes 5) each brush holder 6 essentially has the form of a T with a transverse part 61 extending in the center plane of the ring 7, and with a longitudinal part 62 which extends parallel to the axis of rotation X-X' from a face 72 of the ring 7, opposite the face which rests on the shoulder 31. Each brush holder 6 consists of a section of a profiled bar having a cross section essentially in the shape of a T, as seen in FIG. 3. The brush holders 6 are made of a material having sufficient dimensional stability within the range of operating temperatures of the motor M and which is also electrically conducting.

As seen in FIG. 3, the transverse part 61 of each brush holder 6 is formed by two lateral walls 611 and 612, which extend on either side of the longitudinal part 62 and at right angles with the latter. The two walls 611 and 612 connect the face 63 and an opposite face 64 of the brush holder 6. The walls 611 and 612 are embedded in the insulating material which constitutes the ring 7, so that they form the supporting bases for the brush holders 6 in their mounting position. The longitudinal part 62 of each brush holder 6 essentially forms an open seating 621 with a essentially rectangular cross section and elongated along the axis X-X'. The seating 621 opens on the one hand on the face 63 where the pin 14 is attached, and on the other, on the face 64, facing the part of the rotor 1 projecting from the center opening 71 (FIGS. 2 and 6) of the ring 7.

A commutator brush 5 is mounted slidingly in the open seating 621 in a manner such that the contact surface 51 of the brush 5 facing the rotor 1, is resting against the periphery of the latter.

It is seen in FIGS. 1 and 3 that the brush 5 consists of two identical contact elements 53 and 54, so that the surface of the contact 51 is represented in FIG. 3 by two zones 513 and 514, outlined by a dotted line and corresponding respectively to the contact elements 53 and 54 of the brush 5.

At the free end 65 of the brush holder 6 a finger 66 extends; it is integral with one of the longitudinal walls of the seating 621 and essentially parallel to the wall 612 of the transverse part 61.

A hole 67 is formed in said finger 66, opening essentially perpendicularly to the face 63 of the brush holder 6. The pin 14 described above is fastened in this hole by welding or threading.

It is further noted here that the open seating 621 comprises on its longitudinal side opposite the finger 66, two grooves 68 and 69, which open respectively facing the mounting zones 513 and 514 of the contactor elements 53 and 54 of the brush 5. Furthermore, each of these grooves 68 and 69 open onto the face 63 of the brush holder 6, in a manner such that retracting springs (not shown) may be inserted in order to apply to the contactor elements 53 and 54 of the brush 5 a force making it possible for the contact surface 51 to abut against the rotor 1, in order to establish an electrical contact between the rotor 1 and the stator 2.

As seen particularly well in FIG. 4, the conductors 101 and 102 make possible the electric connection of each brush of the same polarity; they consist of the segments 101 and 102 having an essentially square cross section. The segments 101 and 102 are made of a conducting material and are essentially square in their cross section.

It should be noted here that the each of the conducting segments 101 and 102 is embedded in the ring 7 so as not to be in contact with the assembly formed by the segment and brush holder of opposing polarity.

Referring again to FIG. 2 and 3, it is seen that each of the segments 101 and 102 describes a circular arc extending in a plane essentially parallel to the face 72 of the ring 7. One of the ends of each of said segments 101 and 102 is connected with a lateral wall 612 of one of the brush holders 6 and the other end is connected with the lateral wall of the brush holder of the same polarity, attached to the ring 7 in a location diametrically opposed. The conducting segments 101 and 102 and the lateral walls 611 and 612 are assembled by soldering, welding or crimping, for example.

It is readily seen that with such electrical conductors embedded by molding in the ring 7, no insulating sheathing is necessary and also that any risk of the breakage or loosening of said conductors from the brush holders 6 is advantageously reduced.

A second mode of embodiment of the invention described with reference to FIG. 5 and 6.

FIG. 5, which is a partial and sectioned view of an integral piece D' along a plane similar to the plane of FIG. 3, shows a brush holder 6' with a simplified configuration. A transverse part 61 (FIG. 6) of said brush holder 6', which consists of two lateral walls 611' and 612', is embedded by molding in an electrically insulating and thermally stable material, which ring 7. A longitudinal part 62' of the brush holder 6' extends perpendicularly from the transverse part 61' and has a rectangular cross section. The longitudinal part 62' contains an open seating 621' similar to the one described for the first mode of embodiment of the invention, but does not contain grooves.

It is seen in FIG. 5 that the fastening plates of the ring 7 in the shoulder 31 of the cover 3 are advantageously replaced by washers designated 8'.

FIG. 6 shows that the brush holder 6' does not have a finger 66 for a connection with blade connectors 13 and the electrical connecting cable 15 of the device. The finger 66 is replaced in this mode of embodiment by a tab 66' which contains a threaded hole, as shown in FIG. 5. The tab 66' makes it possible to fasten a blade connector 13' and a connecting cable 15' by means of locking nuts 19'.

The pieces and elements of the integral piece D' seen in FIGS. 5 and 6 which are similar to or identical with those of the device D described above, are designated by the same reference numerals and thus do not need to be described.

The brush holder device according to the invention is produced in the following manner.

Initially, two conducting segment-brush holder elements are formed by the welding, soldering or crimping of the ends of the segments 101 and 102 with the brush holders 6. The two assemblies constituted in this fashion are then placed into a mold (not shown) with the brush holders 6 and the segments 101, 102 immobilized in their precise mounting position. This mounting position shown in the figures is such that the longitudinal part 62 of each brush holder 6 is placed with the faces 63 and 64 tangent to the radii of the ring 7 that is to be obtained by molding and which extends in a plane parallel to the X-X' axis.

It is readily seen that this mounting position of the brush holders 6 makes it possible for the contact surfaces 51 of each brush 5 of the motor M to come into contact with the periphery of the rotor thereby insuring the electrical connection of the latter with the stator 2.

Once the conducting segments 101 and 102, together with the brush holders 6, are placed and immobilized with precision in their assembly position, a thermally stable insulating material is poured into the mold in order to form a ring 7. The pins 14 and the springs (not shown) are then mounted on the brush holders 6. It is mentioned here that the pins 14 may also be attached to the brush holders 6 prior to the molding operations.

The brush holder device described above and obtained as explained here, has the principal advantage of consisting of an integral piece comprising the conductors and the brush holders.

With such an integral piece the precise positioning of the brush holders 6 with respect to each other and relative to the rotor may be obtained easily by placing the ring 7 against the shoulder 31 of the cover 3.

The brush holders of the device according to the invention may also be two, six, eight or more in numbers. Furthermore, the device advantageously improves the commutation between the poles of the motor by making possible the positioning of the brushes axially, non-axially or with an offset, depending on the assembly position chosen in the molding of the brush holders.

In this manner a simple, rigid and homogeneous device is obtained, which considerably reduces the cost of producing the motor M by limiting the assembly time and the quantity of pieces required in the manufacture of the commutator.

It is noted further that due to the internal connections between the brush holders and the conductors, the cooling of the connecting brushes is improved.

It should be understood that the invention is not limited to the modes of embodiment described and illustrated above, which are given as examples only. To the contrary, the invention comprises all technical equivalents of the means described, together with their combinations, if carried out in keeping with its concept.

What is claimed is:

1. A brush holder device for a commutating electrical machine, said device including
   electrical conductors in the form of segments, have an essentially square cross section and extend in a circular arc in a plane essentially parallel to the plane perpendicular to an axis of rotation of a rotor,
   a ring capable of being in fixed relation with a stator, and capable of being located in a plane perpendicular to an axis of rotation of a rotor, a part of said rotor projecting through a center opening of the ring, and
   brush holders fastened to the ring and connected electrically in pairs by said electrical conductors,
   each brush holder comprising a recess located relative to a periphery of the projecting part of the rotor and in which a commutator brush is mounted so as to establish an electrical contact between the rotor and the stator,
   wherein the brush holders and the conductors are integral parts of said ring, said ring being made of a thermally stable insulating material, the brush holders and the conductors being fastened in their assembly position by being molded into said insulating material and wherein said each brush holder includes a cross section profile essentially in a form of a T, with a traverse part embedded by molding into by molding into the insulating material of the ring and a longitudinal part comprising said recess of said brush holder.

2. A device according to claim 1, wherein the transverse part of said each brush holder includes two lateral walls, which extend perpendicularly to the longitudinal part and on both sides of said longitudinal part.

3. A device according to claim 1, wherein each conductor segment is connected at one end with a lateral wall of a first brush holder and at the other end with a lateral wall of another brush holder of a same polarity, said another brush holder being diametrically opposed to the first brush holder, relative to the rotational axis of the rotor.

4. A device according to claim 3, wherein said ends of the conductor segments and the brush holders are connected by means of welding.

5. A device according to claim 1, wherein each conductor segment is connected at one end with a lateral wall of a first brush holder and at another end with a lateral wall of another brush holder of a same polarity, said another brush holder being diametrically opposed to the first brush holder, relative to a rotational axis of the rotor.

6. A device according to claim 5, wherein said ends of the conducting segments and the brush holders are connected by means of welding.

7. A device according to claim 1, wherein the brush mounted in said recess of each brush holder includes two contact elements.

8. A device according to claim 7, wherein the recess of each brush holder comprises two grooves opening opposite each contacting element of the brush and a face of the brush holder, with springs being provided to apply a force to abut a contact surface against the rotor.

9. A device according to claim 3, wherein said ends of said conductor segments and the brush holders are connected by means of soldering.

10. A device according to claim 3, wherein said ends of the conductor segments and the brush holders are connected by means of crimping.

11. A device according to claim 5, wherein said ends of the conductor segments and the brush holders are connected by means of soldering.

12. A device according to claim 5, wherein said ends of the conductor segments and the brush holders are connected by means of crimping.

* * * * *